United States Patent
Steeger (10) Patent No.: US 8,290,160 B1
(45) Date of Patent: Oct. 16, 2012

(54) METHOD AND APPARATUS FOR SECURED FACSIMILE TRANSMISSION

(75) Inventor: Gerd Matthias Steeger, Wegberg (DE)

(73) Assignee: Appalachian Technologies Corporation of Pennsylvania, Annville, PA (US)

( * ) Notice: Subject to any disclaimer, the term of this patent is extended or adjusted under 35 U.S.C. 154(b) by 488 days.

(21) Appl. No.: 09/978,095

(22) Filed: Oct. 17, 2001

(51) Int. Cl.
*H04N 1/44* (2006.01)

(52) U.S. Cl. .................. 380/243; 380/246; 358/426.04; 358/426.16

(58) Field of Classification Search .......... 380/243–246; 358/400, 426.04, 426.16; 713/160; 379/100.01, 379/100.13, 100.15, 100.17
See application file for complete search history.

(56) References Cited

U.S. PATENT DOCUMENTS

| | | | |
|---|---|---|---|
| 4,091,423 A | | 5/1978 | Branscome |
| 5,159,630 A | | 10/1992 | Tseng et al. |
| 5,241,595 A | | 8/1993 | Kuno |
| 5,321,749 A | * | 6/1994 | Virga ............................ 380/243 |
| 5,552,897 A | * | 9/1996 | Mandelbaum et al. ....... 358/400 |
| 5,555,307 A | | 9/1996 | Le Corre et al. |
| 5,692,048 A | | 11/1997 | Gornish et al. |
| 5,905,801 A | * | 5/1999 | Serinken ........................ 380/51 |
| 5,920,625 A | | 7/1999 | Davies |
| 6,014,444 A | * | 1/2000 | Nakamura et al. ............ 380/260 |
| 6,021,186 A | * | 2/2000 | Suzuki et al. ............ 379/100.12 |
| 6,061,790 A | * | 5/2000 | Bodnar ......................... 713/171 |
| 6,144,459 A | * | 11/2000 | Satou ............................ 358/1.15 |
| 6,297,892 B1 | * | 10/2001 | Stein et al. .................... 358/443 |
| 6,950,213 B1 | * | 9/2005 | Gurevich ...................... 358/401 |

FOREIGN PATENT DOCUMENTS

| | | |
|---|---|---|
| EP | 0-625-845 A1 | 11/1994 |
| EP | 1-045574 A1 | 10/2000 |
| GB | 2-305-813 | 4/1997 |
| WO | WO-98/21880 | 5/1998 |
| WO | WO-00-67466 | 11/2000 |

OTHER PUBLICATIONS

"G3 Facsimile Image Data Encryption Method" IBM Technical Disclosure Bulletin, vol. 32, Issue 8B, Jan. 1990.*
"Facsimile with Encrypted Hard Copy" IBM Technical Disclosure Bulletin, vol. 20, Issue 11B, Apr. 1978.*
Schneier, Bruce. "Applied Cryptography, $2^{nd}$ Edition" © 1996 John Wiley and Sons, Inc. pp. 397-398.*
"Thank You Bob Anderson" Originally published Sep. 9, 1994 http://cypherpunks.venona.com/archive/1994/09/msg00304.html.*
"ISO 646 (Good ole' ASCII)" © 1998 Roman Czyborra. http://czyborra.com/charsets/iso646.html.*
Brain, Marshall. "How Bits and Bytes Work" © 1998-2007 HowStuffWorks, Inc. http://computer.howstuffworks.com/bytes:htm/printable.*

(Continued)

*Primary Examiner* — Kim Vu
*Assistant Examiner* — Thomas Gyorfi
(74) *Attorney, Agent, or Firm* — Ostrolenk Faber LLP (57) ABSTRACT

A novel and unique method, program and apparatus for secured facsimile transmission. It converts the image pixels into 8 bit ASCII characters, encrypting the data and reconverting the encrypted data back into a scrambled image, which is then compressed and transmitted according to international standard of facsimile transmission regulation (CCITT) over an insecure public telephone line to the recipient. The scrambled image is saved in a special memory area of the receiving machine and may be de-scrambled upon an input of a password by the intended recipient.

25 Claims, 10 Drawing Sheets

OTHER PUBLICATIONS

G. Parsons et al. RFC 2306: "Tag Image File Format (TIFF)—F Profile for Facsimile" © 1998 The Internet Society. http://www.ietf.org/rfc/rfc2306.txt.*

"TIFF Revision 6.0 Final" © 1992 Adobe Systems Inc.*

V. Cerf. RFC0020: "ASCII format for Network Interchange" © 1969 Network Working Group. http://www.ietf.org/rfc/rfc0020.txt.*

Schneier, Bruce. Applied Cryptography, $2^{nd}$ Edition. © 1996 Bruce Schneier. pp. 52 & 53.* van der Linden, Peter. "Expert C Programming: Deep C Secrets" © 1994 Prentice Hall Inc. Excerpt from chapter 9 (14 pages).*

International Telecommunication Union ITU-T T-4: Series T: Terminals for Telematic Services. Standardization of Group 3 facsimile terminals for document transmission. Published Apr. 1999. (67 pages).*

International Telecommunication Union ITU-T T-30: Series T: Terminals for Telematic Services. Procedures for document facsimile transmission in the general switched telephone network. Published Apr. 1999 (290 pages).*

International Telecommunication Union ITU-T T-82: Series T: Terminals for Telematic Services. Information Technology—Coded Representation of Picture and Audio Information—Progressive Bi-level Image Compression. Published Mar. 1993 (85 pages).*

L. McIntyre et al. "RFC2301: File Format for Internet Fax" © 1998 The Internet Society (78 pages) http://tools.ietf.org/pdf/rfc2301.pdf.*

"Group 3 Facsimile Communication" © 1997 Garret Wilson. (4 pages) http://www.garretwilson.com/essays/computers/group3fax.html.*

A. Katz. "RFC 797: Format for Bitmap Files" Published Sep. 1981 (2 pages) http://tools.ietf.org/pdf/rfc797.pdf.*

"Fax Ettiquette" SciEssence, LLC Fax Ettiquette Page. © 2000 SciEssence, LLC (2 pages) http://sciessence.com/FaxEtiquette.html.*

\* cited by examiner

Gerd Steeger

METHOD AND APPARATUS FOR SECURED FACSIMILE TRANSMISSION

BACKGROUND OF THE INVENTION

1. Field of the Invention

The present invention relates generally to the field of telecommunication equipment and technologies. More particularly, the present invention relates to the field of method, program and apparatus for secured facsimile transmissions.

2. Description of the Prior Art

Facsimile transmissions are very common in the business world today. In the most cases, facsimile transmissions are replacing regular mail (or UPS® and FedEx®), because the recipient receives the messages within minutes instead of hours or days or weeks.

Oftentimes sensitive information (such as technical drawing of an invention, financial or personal business data) needs to be transferred to a receiving party by facsimile transmission. However, it is very often the case that the fax device is accessible by many people for instance in a big office room or hotel. So the staff member can view the contents of the fax before it arrives the intended recipient. Having sensitive information viewed by unintended viewers can result in extremely negative consequences for an individual, company or government.

Another well known problem is industrial espionage which leads to annual losses of billions of dollar because of the fact that all fax transmission on a public network are done in a standard form (CCITT), easy to read like plaintext and therefore easy to intercept.

Another scenario is drawn when a fax does not arrives at the valid recipient because of a mistyping of the fax number, pressing the wrong speed dial key or an error in the telephone network. In this case, sensitive information goes into the wrong hands, which can lead to harm.

As a result, secured facsimile transmission becomes more and more important and a desired way of transmitting a document over a public telephone network. The following prior art references are found to be pertinent to this field of art:

1. U.S. Pat. No. 4,091,423 issued to Branscome on May 23, 1978 for "Synchronous Digital Data Scrambling System" (hereafter the "Branscome Patent");
2. U.S. Pat. No. 5,159,630 issued to Tseng et al. on Oct. 27, 1992 for "Facsimile Message Encryption System" (hereafter the "Tseng Patent");
3. U.S. Pat. No. 5,241,595 issued to Kuno on Aug. 31, 1993 for "Communication Control Section For Facsimile Equipment Having A Secure Communication Function" (hereafter the "Kuno Patent");
4. U.S. Pat. No. 5,555,307 issued to Le Cone et al. on Sep. 10, 1996 for "Device and Process for Rendering Secure the Transmission of Faxes As Well As Fax Unit Which Has Been Made Secure and Incorporating Such A Device" (hereafter the "Le Cone Patent");
5. U.S. Pat. No. 5,692,048 issued to Gormish et al. on Nov. 25, 1997 for "Method and Apparatus for Sending Secure Facsimile Transmissions and Certified Facsimile Transmissions" (hereafter the "Gormish Patent");
6. U.S. Pat. No. 5,920,625 issued to Davies on Jul. 6, 1999 for "Method and Apparatus for Transmitting and Receiving Encrypted Signals" (hereafter the "Davies Patent");
7. European Patent Application Publication No. 0-625-845-A1 published on Nov. 23, 1994 for "Ciphering Device and Method in Facsimile" (hereafter "EP 0-625-845-A1");
8. United Kingdom Patent Application Publication No. GB-2-305-813-A published on Apr. 16, 1997 for "Data Encoding In Facsimile Systems" (hereafter "UK 2-305-813-A");
9. PCT Patent Application Publication No. WO-98/21880 published on May 22, 1998 for "Method and System for Ensuring the Security of Fax Transmission Using An Identifying Card" (hereafter "PCT WO-98/21880");
10. European Patent Application Publication No. EP-1-045-574-A1 published on Oct. 18, 2000 for "Method and Apparatus for Sending or Receiving A Secure Fax" (hereafter "EP 1-045-574-A1"); and
11. PCT Patent Application Publication No. WO-00/67466 published on Nov. 9, 2000 for "System of Providing Secure Transmission for Facsimile Data Modem Signals" (hereafter "PCT WO-00/67466").

The Branscome Patent discloses a system for scrambling digital signals transmitted between a synchronous data transmitting station and a receiving station. The system includes a first scrambler and a second scrambler. When the scrambling system is used with a facsimile system, a first scrambler is connected between the video amplifier and the transmitter modulator of the transmitting facsimile station. The first scrambler includes digital circuitry for digitizing the output of the amplifier and enciphering circuitry for enciphering the digitized output of the video amplifier and for transmitting the enciphered output to the receiving facsimile station. A second scrambler is connected between the demodulator and the write amplifier of the receiving facsimile station. The second scrambler includes deciphering circuitry for deciphering the output of the demodulator and for applying the deciphered output to the write amplifier to provide a duplicate of the transmitted facsimile material. Initialization between the first and second scrambler is accomplished with the use of correlation and prime patterns. Circuitry is provided to maintain the first and second scramblers in synchronization with one another, and alarm systems are provided to indicate malfunction of the scramblers and to prevent the transmission of the scramblers and to prevent the transmission of sensitive data in the unciphered state.

The Tseng Patent discloses a system for maintaining the security of information transmitted between facsimile machines. The system includes a transmitting/receiving facsimile machine for receiving input sheets having an encryption zone; an image sensor for detecting the encryption zones; an encryption device for scrambling messages that appear within an encryption zone. Further the system includes means for sensing encryption zones on transmitted messages and for decoding messages that have been scrambled within the encryption zones.

The Kuno Patent discloses a facsimile equipment. The facsimile equipment includes a memory for storing a cipher key data, ten number keys for inputting the cipher key data, a DTMF signal receiving circuit for converting a DTMF signal received through a telephone line into the cipher key data, a controller for controlling the memory to selectively store the cipher key data input by means of the ten number keys or the cipher key data converted by the DTMF signal receiving circuit, a DTMF signal generating circuit for converting the cipher key data stored in the memory into a DTMF signal and generating this DTMF signal to the telephone line, and a controller for scrambling an image data to be transmitted with the cipher key data stored in the memory to provide the transmission data and for descrambling the scrambled image data received with the cipher key data stored in the memory to provide the reception data.

The Le Cone Patent discloses a device and process for securing the transmission of telecopies or faxes and a secured telecopier or fax unit having such a security device. The device incorporates a user interface permitting the establishment of a dialogue therewith and a security module permitting the production and checking of digital signatures and preventing replay.

The Gormish Patent discloses a facsimile transmission system with a first facsimile machine that includes at least a scanner for scanning documents inserted into a document feeder and transmission capabilities for sending a fax and with a second facsimile machine that includes at least reception capabilities for receiving the fax and a printer for printing a hard copy of the received fax, if necessary. The facsimile system may include functionality for securing the facsimile transmission. The facsimile system may include functionality to enable the facsimile transmission to be certified.

The Davies Patent discloses an encrypted signal compatible with first and second encryption systems which is generated by producing encryption data signals relating to each encryption system. A difference signal is derived from the two encryption data signals and the signal to be encrypted is encrypted in accordance with one of the encryption systems. At an output the encrypted signal, the two encryption signals, and the difference signal are made available. At a decoder compatible with, for example, the first encryption system, the encrypted data, the second encryption data signal, and the different signal are received. The decoder can then derive the first encryption data signal from the second encryption data signal and the difference signal and can then decode the encrypted signal.

EP 0-625-845-A1 discloses a ciphering device in a facsimile apparatus. The ciphering device is provided in which a signal to be ciphered comprising a coded signal and a control code added thereto is ciphered in units of n bits. The device comprises means for judging whether or not the total number of bits composing the signal to be ciphered is a multiple of n, and means for adding random data behind the signal to be ciphered so that the total number of bits composing the signal to be ciphered is a multiple of n and ciphering a signal comprising the signal to be ciphered and the random data added thereto in units of n bits when the total number of bits is not a multiple of n.

GB 2-305-813-A discloses a data encoding method for a facsimile system. According to the method, image data is scanned from a document and subsequently Modified Huffman or Modified Read encoded. The encoded data is XORed with a previously registered password prior to transmission. The encoded data is modulated into an analog signal and output to a line interface unit. As the process encodes and decodes image data using a registered password, it is able to improve the security of data.

PCT WO-98/21880 discloses a method and system for safely transmitting a fax between a transmitter sending the fax and at least a receiver receiving the fax using a fax machine associated with a telephone equipment. The faxes are routed between a transmitter and a receiver by a communication network via a fax management center. The fax management center provides the receiver with a card, formatted like a credit card, personalized by specific identifiers for each card and each receiver. This card emits brief identifying sound signals, of the DTME type, at least partially encrypted, varying with each operation, when it is actuated by the receiver. The signals received by the microphone of the telephone equipment are transmitted by the communication network to the computer services of the fax management center. The transmitted signals and the identification data of the receiver and of the card held by the computer services, are electronically processed and compared by the computer service of the fax management center. In the event of coincidence, the fax management center transmits to the fax machine of the receiver the fax sent to him by the transmitter.

EP 1-045-574-A1 discloses a method and apparatus which sends an encrypted FAX document to a receiving party. The encrypted FAX is printed out by a receiving FAX with an unencrypted heading, indicating who the intended recipient of the received encrypted FAX is, and a body of the FAX in an encrypted format. Once the intended recipient receives the encrypted FAX document, the document can be scanned and decoded after the intended recipient provides a decode code. The decoded document can be printed by or viewed on a computer.

PCT WO-00/67466 discloses a security system which operates to secure the transmission of data between authorized modems and against interception by an unauthorized modem. The modems each implement a defined protocol that includes negotiation and data transport portions of a communications session that is conducted over a network utilizing signals. selectively occurring in a plurality of frequency channels. The security device includes a first interface coupleable to a modem to exchange first predetermined signals occurring in a first plurality of frequency channels and a second interface coupleable to a network to exchange second predetermined signals occurring in a second plurality of frequency channels. A signal processor is coupled between the first and second interfaces, to implement a bidirectional conversion of the signals between the first and second plurality of frequency channels by frequency shifting the first and second predetermined signals between the first and second pluralities of frequency channels. Further, the security device can provide for a first frequency shift of greater than a predetermined frequency tolerance specified by the defined protocol for a first portion of said communications session and a second frequency shift for a second portion of the communications session.

While various approaches have been developed in connection with secured facsimile transmission, they present certain limitations and drawbacks. For example, the method disclosed in UK application requires special fax machines on both the sending and receiving ends of the transmission and is not compatible with existing conventional fax protocols. Therefore, it is desirable to have a method, program and apparatus for sending and receiving fax documents in a secured manner which is still compatible with existing fax protocols.

SUMMARY OF THE INVENTION

The present invention is a novel and unique method, program and apparatus for secured facsimile transmission.

It is an object of the present invention to provide a method, program and apparatus for secured facsimile transmission that disables the ability of people, other than the intended recipient, from viewing the received fax document.

It is another object of the present invention to provide a method, program and apparatus for secured facsimile transmission that eliminates this risk of intercepting messages in a public network while it maintains compatibility and easy to use handling of the device (or fax software).

These objects of the present invention can be achieved by adding a module, which encrypts/decrypts the fax image in a very secure manner.

Described generally, the present invention is a secured facsimile transmission system that includes fax devices with appropriated equipment or personal computers (PCs) with appropriate software for sending and receiving facsimile transmissions. The fax devices has a scanner for scanning documents, a document feeder, and transmission capabilities for sending a fax and reception capabilities for receiving a fax. The fax devices also include a printer for printing a hard copy of the received fax and an encryption module with a separate memory (for the functionality of secure facsimile transmission) for the image encryption procedure. The fax devices further have an operation panel which has a display for input requests, a keyboard for character input and an optional card reader for private key inputs. The PC fax software has a printer driver to create a TIFF Group 3 image, and an encryption module.

To transfer a facsimile image in accordance to the CCITT regulations, the scanned image has to be compressed by "Modified Read" or "Modified Huffman Encoding" which makes it easy to read this document for anyone. In the present invention system, the pixel of an image in each line will be read into 8 bit blocks so that it can be converted into 8-bit standard ASCII characters. These characters will be encrypted by a stream cipher and handled in the same manner as we would encrypt document data. In order to do that, a password has to be agreed before and hashed by a secure hash algorithm. This encrypted data will be converted back into pixel, so that "Modified Huffman" can compress the image. This compressed image will be modulated and transferred by a network control unit. A marker will be added to make sure that the fax header remains unencrypted so that it is kept readable for the recipient.

According to the present invention, the user can choose between a standard and an optimized way of sending a secure fax. The "Standard" encryption scrambles all pixel of a row, regardless whether there are blank (only white) or not. The "Optimized" encryption concept pays attention to this fact and leaves the blank rows unencrypted which ends in short image sizes, high compression rate and therefore short transmission time.

On the reception side, a secure fax transmission will be detected by a marker added to the fax number of the sender or fax user data, which comes along the speed or resolution in the negotiation phase. The fax will be kept in memory until the recipient asks for the fax message and inputs the correct password phrase. When the input of the password phrase is confirmed, the printer will print out the secure fax so that the recipient can keep a hard copy of the fax transmission in hand.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a method, program and apparatus for secured facsimile transmission.

Figure 5:
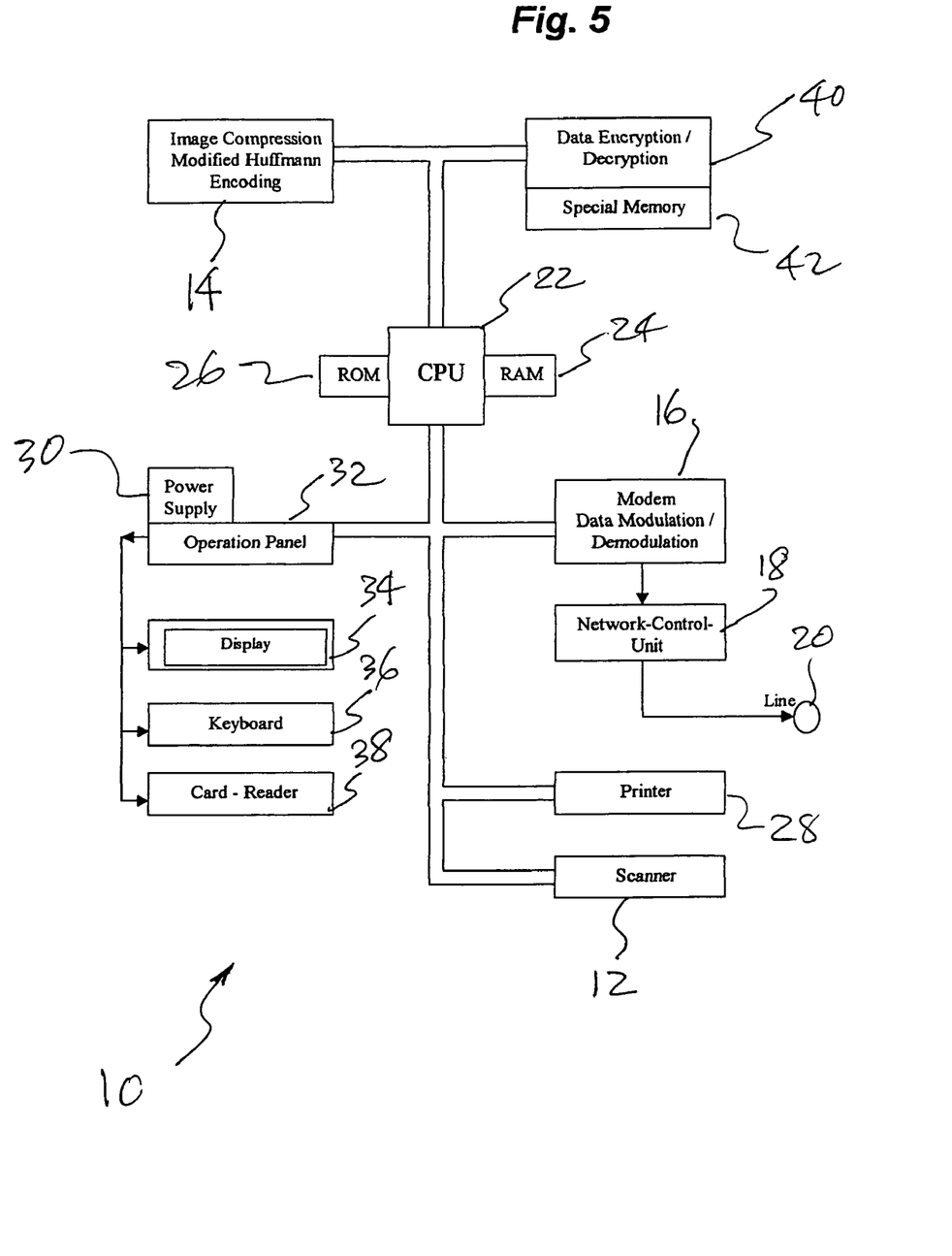
FIG. 5 is an illustrative block diagram showing the functional components of the present invention apparatus for secured facsimile transmission.

Referring to FIG. 5, there is shown a preferred embodiment of the present invention apparatus 10 for secured facsimile transmission. In the illustrated embodiment, the device 10 includes a scanner 12, which is able to read all pixels of a document line by line. In a PC fax embodiment, this part is done by a software which is called a printer driver.

The device 10 also includes a circuit/software compression/expansion module 14 to compress image data with Modified Read or Modified Huffman Encoding, which performs compression and/or expansion and which is seen like a conventional analog/digital (AC) converter. The compression level depends on the complexity of the image.

When the fax device 10 operates to transmit data, the compression/expansion module 14 compresses the data that it receives from the scanner. When the device 10 receives data, the compression/expansion module 14 decompresses or expands the data that it receives from the modem 16. The modem 16 is a device for modulating/demodulating ordinary telephone signals. As also shown, a network control unit 18 connects the modem 16 to a telephone line 20.

In a PC embodiment where a personal computer (PC) is used to directly transmit a document from the PC, a fax-modem may be used.

The modem 16 and network control unit 18 are connected to a central processing unit (CPU) 22. The CPU 22 includes a processor, a conventional random-access-memory (RAM) 24 and read-only-memory (ROM) 26.

In addition, the device 10 includes a printer 28 to create hard copies of the received fax. This printer can be a thermal, laser, inkjet or dot matrix printer. The device 10 includes also a power supply 30, and an operation panel 32. The operation panel 32 comprises a display 34 for user requests or messages, a keyboard 36 for inputs, and an optional card reader 38 which can be connected with the operation panel 32 in order to read the private key of the public key encryption system.

In the PC embodiment, interface devices such as monitor, keyboard and mouse and/or other input/output devices are provided for user interface.

The present invention fax device 10 includes a new, separate module 40 to encrypt and/or decrypt digital information and an appropriated memory 42. In the fax machine embodiment, the encryption/decryption device 40 may be a circuit or a module. In the PC fax embodiment the function of the module 40 may be perform by a special software.

Figure 1:
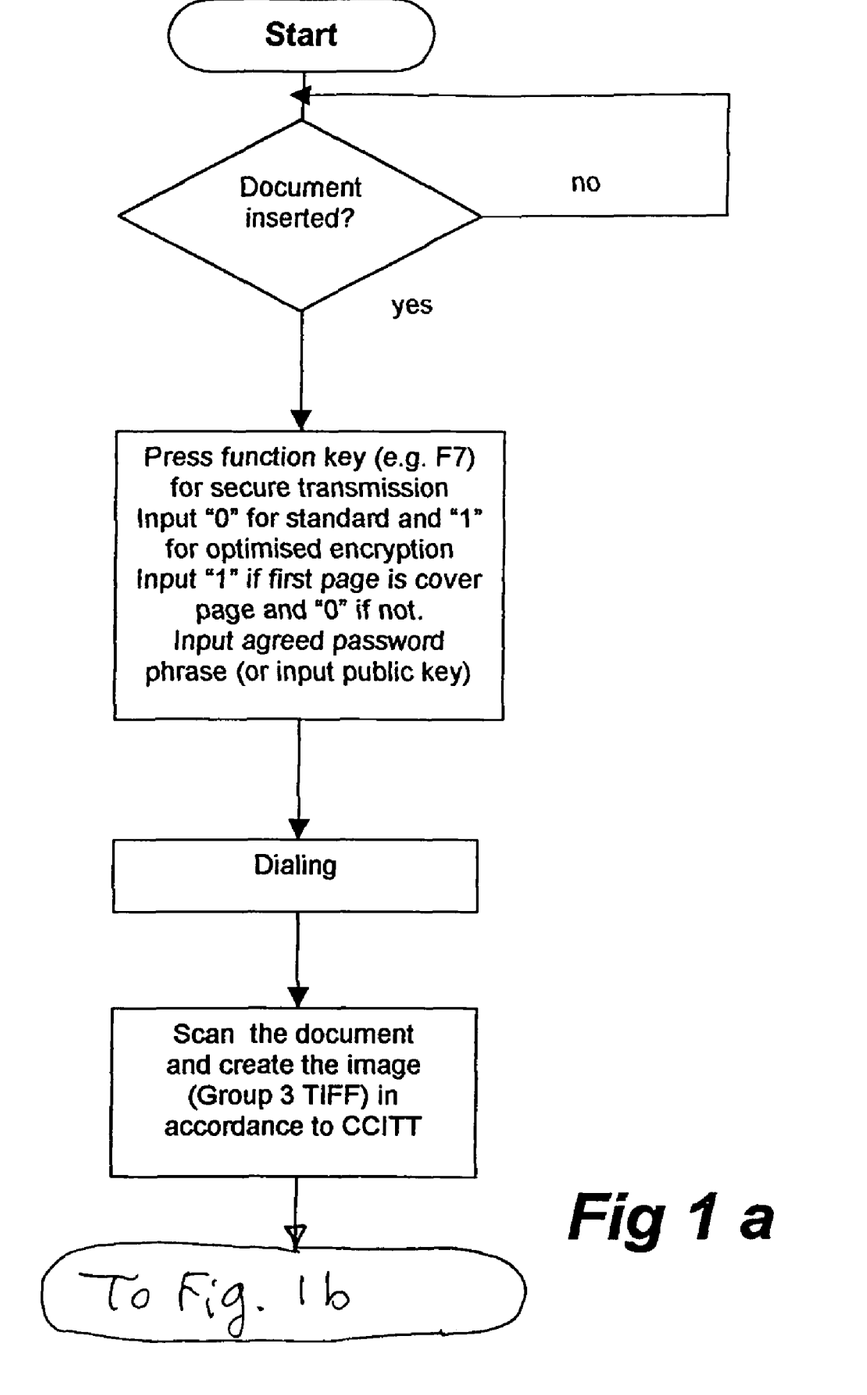
FIG. 1a and FIG. 1b constitute an illustrative flow-chart diagram showing the logical steps of the present invention method of sending a secured facsimile transmission.
Figure 1B:
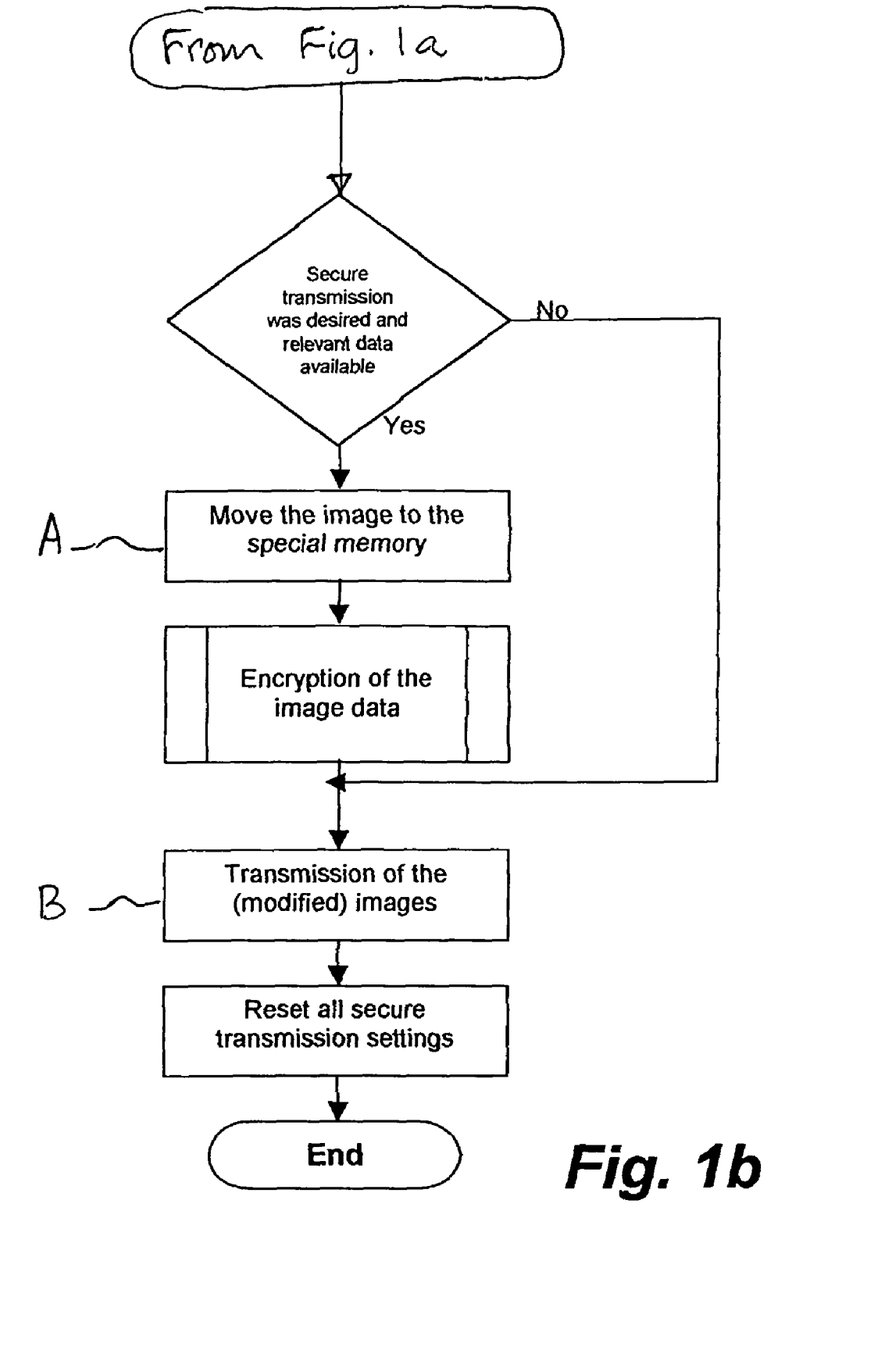
Figure 2:
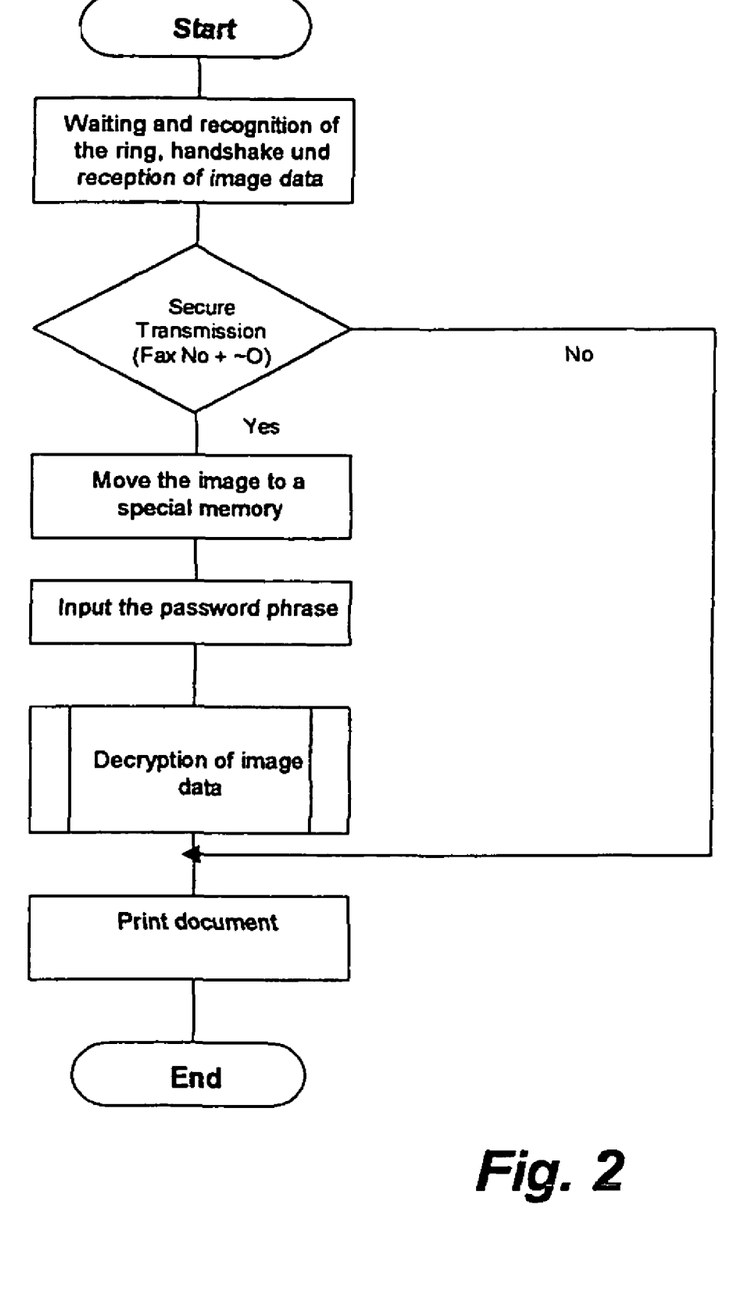
FIG. 2 is an illustrative flow-chart diagram showing the logical steps of the present invention method of receiving a secured facsimile transmission.

Referring to FIGS. 1*a*, 1*b* and 2, there is shown flow-chart diagrams on how the present invention method of secure facsimile transmission works. After the document is inserted into the page feeder, a function key (for example F7) has to be pressed in order to use the secure fax transmission mode. On the display, the user will be asked whether he or she wants to choose the standard encryption scheme or the optimized one. The next user request is with regards to the situation: whether the user wants to encrypt the first page (which is mostly the cover page) or not. After this value (can be done by "0" or "1") is set, the user will be asked to input a password phrase. The security of this system lies in the strength of the password. The initial password may be provided to the recipient in a separate and secure communication. This is only necessary once (the next time a password list with more passwords can be sent by secure fax transmission) and only in case of symmetric key where the sender and recipient has to agree the same password) system.

Another solution is the implementation of public key systems. The recipient has a public key which everybody can know and a private key (which is unknown to others). Only the private key enables the recipient to open the message. The disadvantage of public keys lies in the possibility of key escrow, which means, that the cryptosystem can hold a "backdoor password".

The clipper cryptosystem is the best known example for key escrow. Key escrow is impossible in symmetric key management and by far (so long, the key can be exchanged) the most secure solution.

After responding to the request with valid input by the user, the fax device will dial and try to maintain a connection. The negotiation phase will follow. After that, the image will be scanned line by line until the whole page is completely scanned. This procedure will result in creating an uncompressed image. At this point, digital image data is present.

If no secure transmission is desired, the fax device will immediately transmit the image. If secure transmission is desired, the fax device will move the image to a special memory such as a random access memory (RAM), which is part of the encryption/decryption module. The memory is helpful to manipulate the pixel of the image by the cipher module. After encryption (which will be explained later in detail), the manipulated fax image will be transmitted and all secure transmission settings will be reset.

On the receiving end, once the fax is received by the receiving fax machine, it will be saved in a separate special memory if it is determined that the transmission is a secured transmission (if it is not a secured transmission, then it will be treated as a normal fax document without further decryption). The recipient needs to input a correct password to have the scrambled image decrypted before a legible copy can be printed out. The decryption process is the reverse of the encryption process described herein.

Figure 3A:
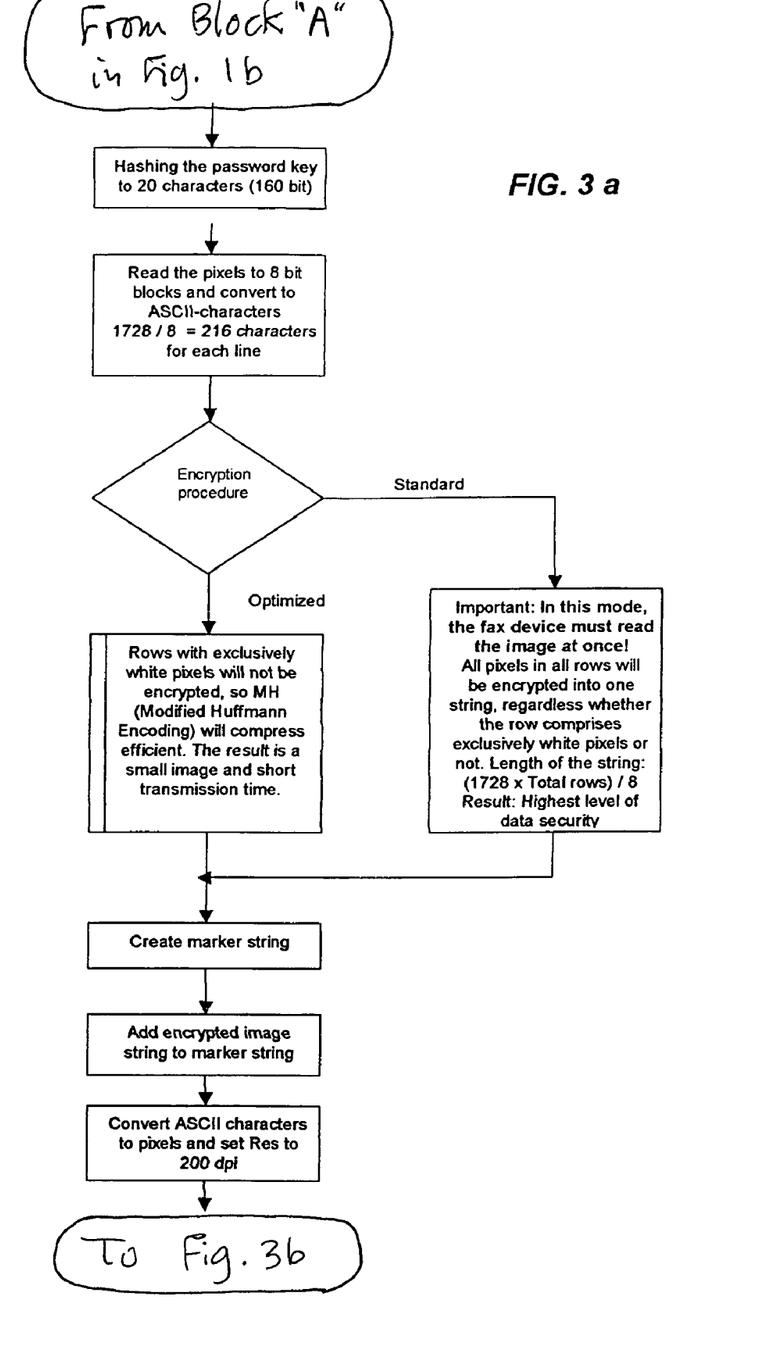
FIG. 3a is an illustrative flow-chart diagram showing the logical steps of the image encryption process of the present invention method of sending a secured facsimile transmission.
Figure 3B:
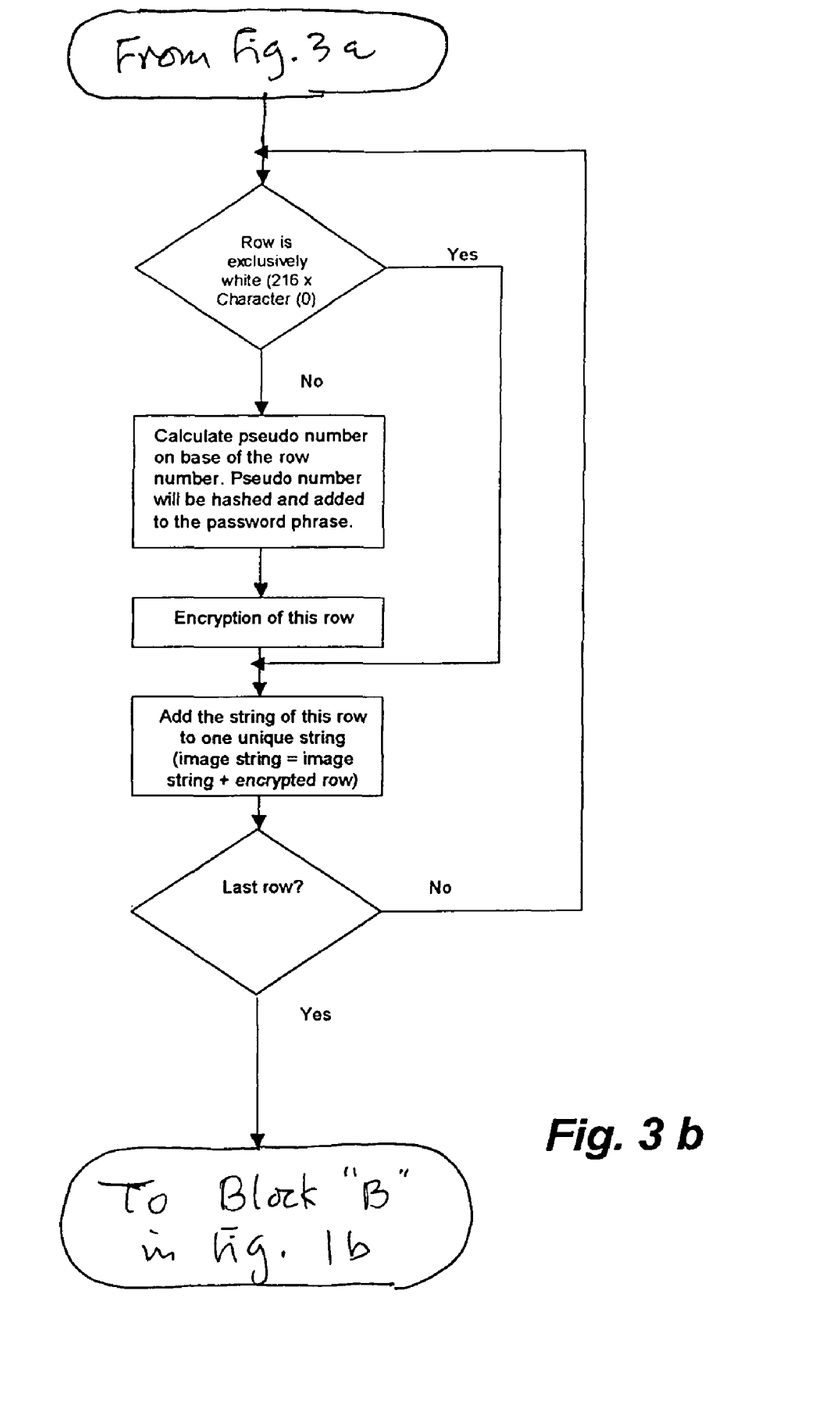
FIG. 3b is an illustrative flow-chart diagram showing the logical steps of the optimized image encryption process of the present invention method of sending a secured facsimile transmission.

Referring to FIGS. 3*a* and 3*b*, there is illustrated how the encryption process works in detail. After the scanned fax image is moved into a special memory, the first step is to hash the password phrase into a secure 20 character (20×8 bit/character=160 bit) long string. This string must comprise all 256 chars of the ASCII table.

The next step is to read each line of the image to 8-bit blocks. Each 8-bit block will be converted by bit shifting into an ASCII-character. A character represents in the PC world 8 bits or one byte. Each line on an 8.5" wide page is represented by 1,728 pixels, which are converted into 216 bytes or characters.

The next step explains how the lines/rows will be read and combined into one single string. In order to do that, the fax device has to read the encryption scheme flag, which is input by the user.

In the standard mode, it is important to scan the page at once to create one image file. All pixel will be read in blocks to 8 pixel/bits. One row/line is represented by 216 bytes/characters. The number of rows varies, but is in most cases more than 1024. All bytes, characters, or blocks will be added to the string, so that we count 216 after the first line is read. The cipher module will now read the next row/line and add the next 216 characters to the string until all lines are converted into one string. With 1024 vertical lines in our example, the string length must be 221184 bytes/characters. This string will be now encrypted by an algorithm, which will be explained later.

Figure 8:
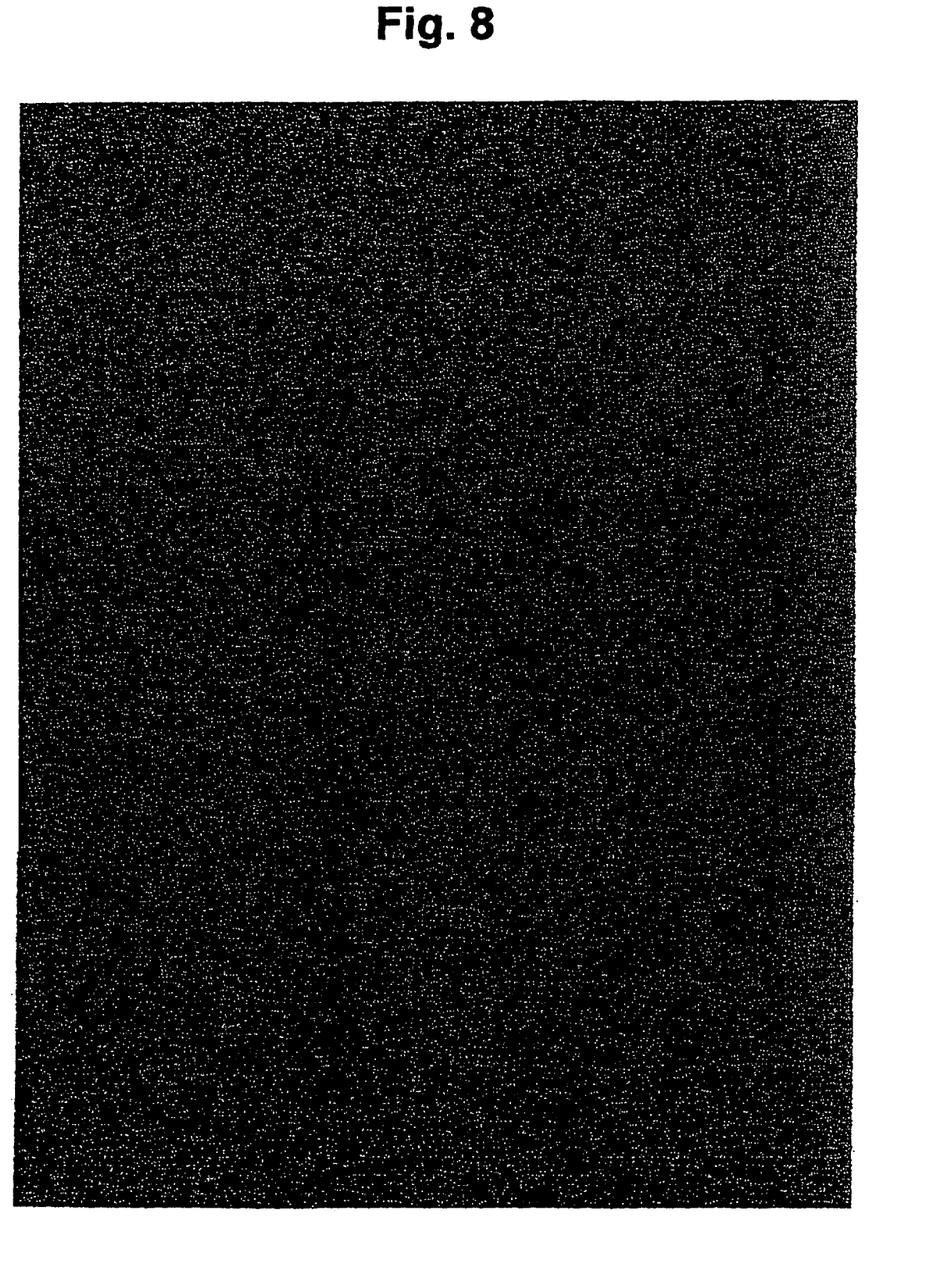
FIG. 8 is an illustrative example of secured fax document received which is sent in standard mode.

Referring to FIG. 8, which illustrates an example of a received fax document in standard mode, where the recipient did not input the right password phrase or did not use the appropriate hardware. Since the whole image is scrambled, the printout at the receiving end (without decryption) will be a scrambled image occupying the entire page.

In the optimized mode, blank lines are skipped from encryption. This encryption scheme pays attention to the fact that a small image size leads to short transmission time. In order to achieve that goal, Modified Huffman Encoding must work very efficiently. This happens when many pixel blocks are either white or black. A run length of 951 white pixel will lead to a make up code "0 1101 0011" and a termination code of "0101 1000" which is much shorter than 951 bits. Instead of scrambling the pixel in this mode, the "pure white" pixel remains unencrypted. Modified Huffman Encoding works in this case very efficiently. The software of this module is determining each line, whether this line contains one or more black pixels. If that is the case, this line will be encrypted, otherwise not. In case that the row/line will be encrypted, the password phrase must be extended with a string, which is generated based on the line/row number. This is very important to do, otherwise the image will show a pattern, which is readable for anyone although the encryption came into effect. As in the standard mode before, all characters of the lines/rows will be added into one long string.

Figure 6:
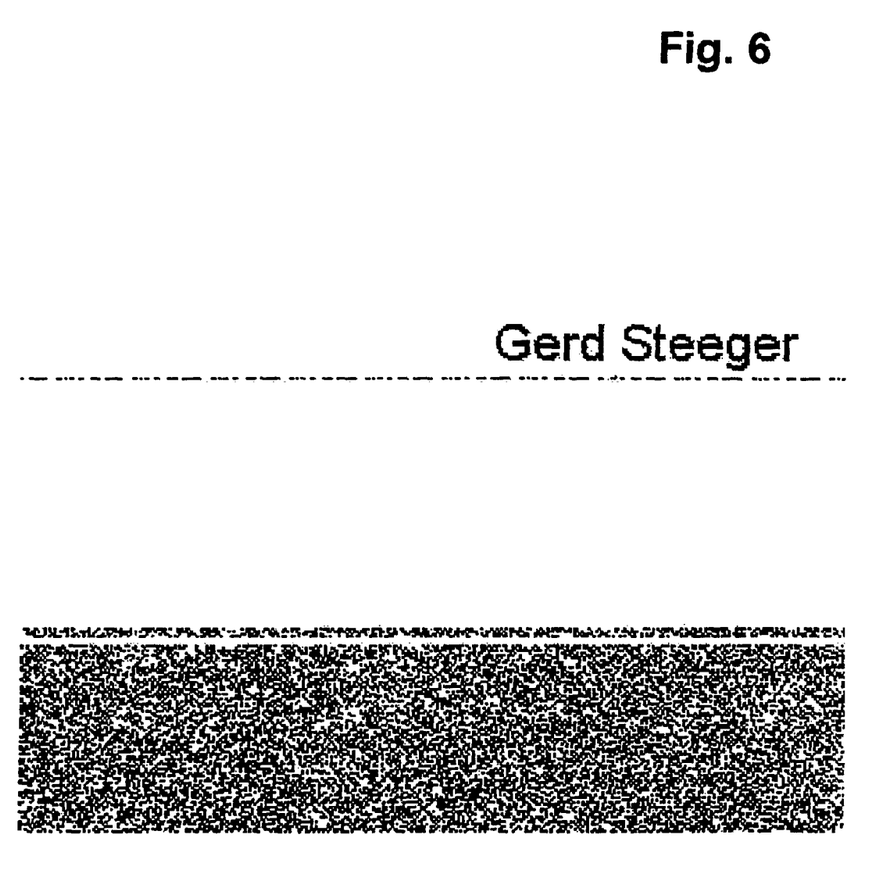
FIG. 6 is an illustrative example of an encrypted fax sent in optimized mode where the marker is the border between the fax header (or banner) and the contents.
Figure 7:
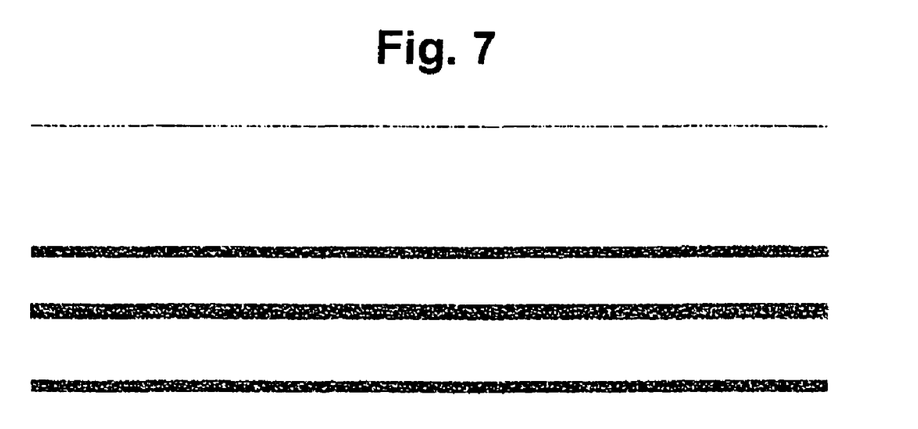
FIG. 7 is an illustrative example of a secured fax document received which is sent in optimized mode.

Referring to FIGS. 6 and 7, there is illustrated examples of received fax documents in optimized mode. In FIG. 6, the document is sent with a header. In FIG. 7, the document is sent without a header, as sent over the public network.

The present invention utilizes an encryption algorithm to scramble the image. It is a fact that different algorithms offer different degrees of security; it depends on how hard they are to break. If the cost required to break an algorithm is greater than the value of the encrypted data, then you are probably safe. If the time required to break an algorithm is longer than the time the encrypted data must remain secret, then the data are probably safe.

The good news is, that the value of most data decreases over time. The value of the data should always remain less than the cost to break the security, which is protecting it. It is highly recommend to use a symmetric key management with a variable key size stream cipher. A well known and long term tested algorithm is RC4 which is immune to differential and linear cryptanalysis. This algorithm, which is tested by many universities in the world, can be in $2^{1700}$ ($256 \times 256^2$) possible states and is one of the fastest algorithms in the world.

The present invention utilizes the RC4 algorithm for encryption. Of course other suitable encryption algorithms may also be used.

Another issue is the key length, which is created by the hash algorithm. An algorithm like SHA1 for instance will hash an insecure password (a combination of accessible characters on the keyboard=96 different characters) into a 20 byte (160 bit) long string which is combined by all characters of the ASCII table. Mathematically spoken, if the key is 160 bit long, then there are $2^{160}$ possible keys. A supercomputer today would take longer to try all possible keys than the whole universe exists.

Of course the present invention depends not on any specific algorithms, because the future will bring better and faster ones.

Figure 4:
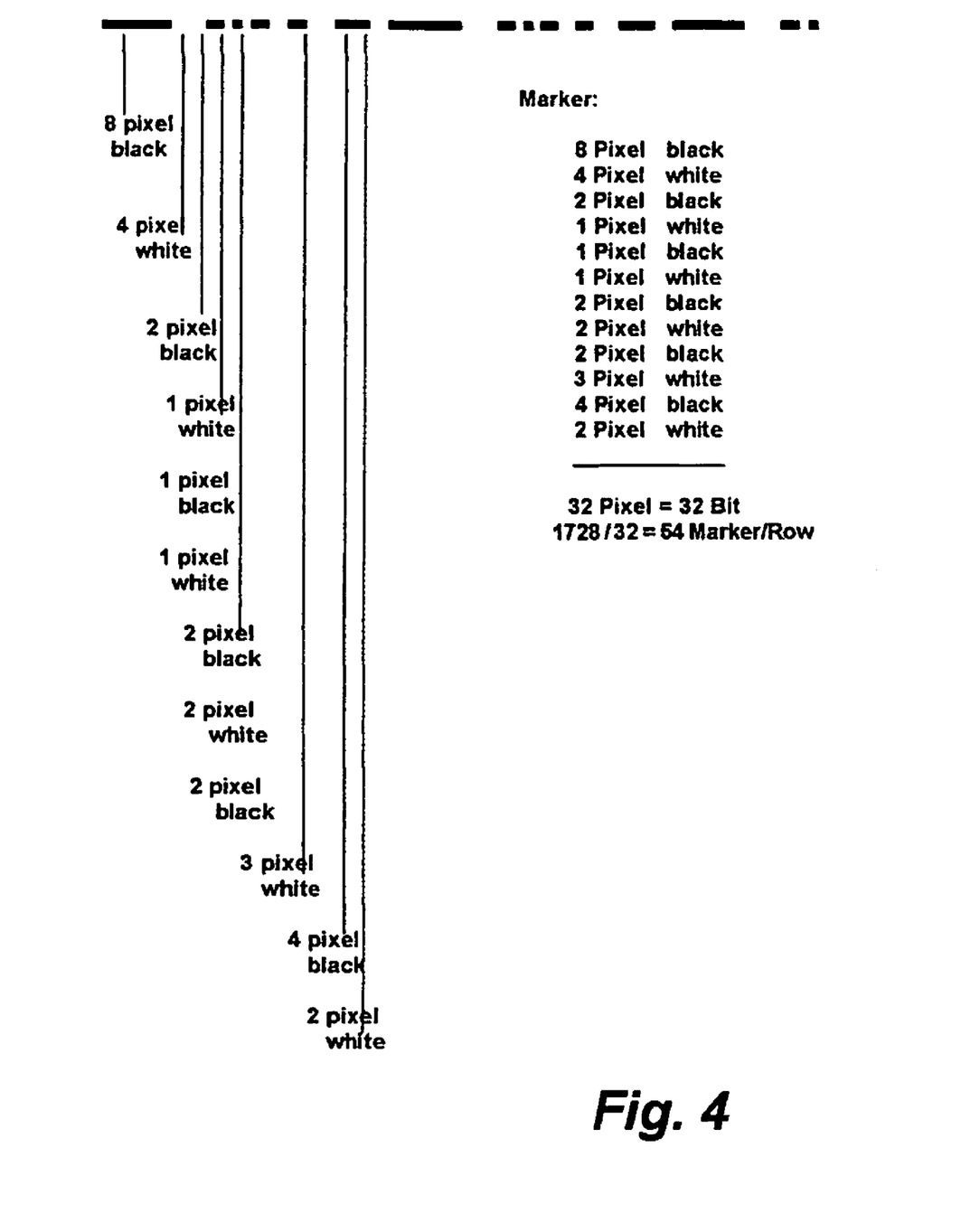
FIG. 4 is an illustrative diagram showing an example of an marker added at the beginning of a secured facsimile transmission according to the present invention.

In order to determine where the fax header ends and the message begins, there must be an optical "border". The solution, here described, uses a marker, which could be any bit pattern. Referring to FIG. 4, there is shown an example of how a 32-bit marker could be designed. The created image string will now be added to the marker, converted back to pixel and transmitted with high resolution (200 dpi).

The present invention method, program and apparatus for secured facsimile transmission has many advantages. These advantages include:

1. It is easy to handle by the user.
2. It is easy to be implemented in the fax device industry.
3. The facsimile transmission is guaranteed, because of the fact that all images (TIFF Group 3) are still after encoding in accordance to CCITT regulation, such that all fax devices in the world can receive the faxes (however, without the security module, the fax are received in a scrambled manner).
4. Certification is guaranteed because all fax machines are able to confirm that the message was received properly.
5. The transmission is direct, which means that there is no need to print out a digital paper, scan the paper together with a PC and then decrypt it in order to read it.
6. The fax banner remains unencrypted, so that the fax header is always readable for anyone.
7. It enables the user to choose, whether the user wants to encrypt the first page or not, which is useful for cover pages.
8. There is no need to arrange a special time to have the recipient present when the confidential message arrives (otherwise it could be very inconvenient, even when the fax device is not idle because it is kept very busy by others), because this modified fax device keeps the fax message in memory until the recipient press as an appropriate function key and inputs the agreed password phrase.
9. It allows the user to choose between two different types of encryption: the first method which is the standard mode encrypts the whole image regardless of whether there are blank rows (rows with exclusively white pixels) which is by far the cipher system with the highest level of security; and the second method which is the optimized mode describes an optimized version of encrypting fax image data where the cipher system pays attention to the fact, whether the scan line of the image comprises only white pixels or not (as the rows with exclusively white pixels will not be encrypted).

Defined broadly, the present invention is a method for providing a secured facsimile transmission of a document, comprising the steps of: (a) generating at least one image of said document; (b) reading the pixels of said at least one image in a series of blocks of a predetermined size; (c) converting said series of pixel blocks into a character string based on an established conversion table; (d) encrypting said character string with an established encryption algorithm to create an encrypted character string; (e) compressing said encrypted character string to create a scrambled image; and (f) transmitting said scrambled image according to an established facsimile transmission standard.

The present invention method as broadly defined above may also comprise a step of receiving said scrambled image which further comprises the steps of: (a) saving said scrambled image in a special memory waiting for its designated recipient of said document; (b) expanding said scrambled image into a character string; c) decrypting said character string; and (d) converting said decrypted character string back into a restored image of said document.

Alternatively defined broadly, the present invention is a system for providing a secured facsimile transmission of a document, comprising: (a) a transmitting device having the capacity of sending a facsimile transmission according to an established facsimile transmission standard; (b) said transmitting device having means for generating at least one image of said document; (c) said transmitting device also having encryption means, which further comprises: a special memory for saving said at least one image; means for reading the pixels of said at least one image in a series of blocks of a predetermined size and converting said series of pixel blocks into a character string based on an established conversion table; means for encrypting said character string with an established encryption algorithm to create an encrypted character string; and (d) said transmitting device further having means for compressing said encrypted character string to create a scrambled image to be sent according to said established facsimile transmission standard.

The present invention system as broadly defined above may also comprise a receiving device which comprises: (a) special memory mens for saving said scrambled image waiting for its designated recipient of said document; (b) means for expanding said scrambled image into a character string; (c) means for decrypting said character string; (d) means for converting it back into a restored image of said document; and (e) means for printing said document received through said facsimile transmission.

In the present invention system, the transmitting and receiving device may be fax machines and/or personal computers (PCs) having the capacity of transmitting and/or receiving a facsimile transmission according to an established facsimile transmission standard.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A method for providing a secured facsimile transmission of a document, comprising the steps of:
   a. providing an option between encrypting and not encrypting a first page of said document;
   b. generating at least one image of said document;
   c. reading the pixels of said at least one image in a series of blocks of a predetermined size;
   d. converting said series of pixel blocks into an ASCII character string based on an established conversion table;
   e. encrypting said ASCII character string with an established encryption algorithm to create an encrypted character string;
   f. placing a marker string and an unencrypted header before the beginning of said encrypted character string, the marker string being placed between said unencrypted header and said encrypted character string;
   g. compressing said encrypted character string to create a scrambled image;
   h. providing an option between a standard encryption mode and an optimized encryption mode to encrypt the portion of said document after said first page of said document if the option of not encrypting said first page of said document is selected or to encrypt the entirety of said document if the option of encrypting said first page of said document is selected, wherein in the standard encryption mode one image is generated from the portion of said document after said first page of said document or from the entirety of said document, and in the optimized encryption mode a series of small images are generated line by line from the portion of said document after said first page of said document or from the entirety of said document and each of said series of small images is converted into a short character string where a character string of an image of a blank line with only white pixels is not encrypted before compression;
   i. transmitting, by a transmitting device, said scrambled image according to an established facsimile transmission standard; and
   j. receiving said scrambled image in a receiving device according to an established facsimile transmission standard, wherein said step of receiving said scrambled image further comprises the steps of:
      1. saving said scrambled image in a special memory in said receiving device waiting for its designated recipient of said document;
      2. said receiving device expanding said scrambled image saved in said special memory into a character string stored in said receiving device;
      3. said receiving device decrypting said character string stored in said receiving device into a decrypted character string stored in said receiving device;
      4. said receiving device converting said decrypted character string stored in said receiving device back into a restored image of said document stored in said receiving device; and
      5. said receiving device printing said document in decrypted form from said restored image of said document.

2. The method in accordance with claim 1, further comprising the step of hashing a password key to said encrypted character string.

3. The method in accordance with claim 1, further comprising the step of providing an option between a secured facsimile transmission and an unsecured facsimile transmission.

4. The method in accordance with claim 1, further comprising the step of requesting a password from said designated recipient.

5. A system for providing a secured facsimile transmission of a document, comprising:
   a. a transmitting device having the capacity of sending a facsimile transmission according to an established facsimile transmission standard;
      said transmitting device having means for accepting an input of said document;
      said transmitting device having means for generating at least one image of said document;
      said transmitting device also having encryption means, which further comprises:
         i. a special memory for saving said at least one image;
         ii. means for reading the pixels of said at least one image in a series of blocks of a predetermined size and converting said series of pixel blocks into an ASCII character string based on an established conversion table; and
         iii. means for encrypting said ASCII character string with an established encryption algorithm to create an encrypted character string;
      said transmitting device providing an option between encrypting and not encrypting a first page of said document;
      said encryption means having a standard encryption mode wherein one image is generated from the portion of said document after said first page of said document if the option of not encrypting said first page of said document is selected or from the entirety of said document if the option of encrypting said first page of said document is selected, and an optimized encryption mode wherein a series of small images are generated line by line from the portion of said document after said first page of said document if the option of not encrypting said first page of said document is selected or from the entirety of said document if the option of encrypting said first page of said document is selected and each of said series of small images is converted into a short character string where a character string of an image of a blank line with only white pixels is not encrypted before compression, each of said series of small images consisting of a single row of pixels, the number of pixels in said row being determined by a dimension of said document parallel to said row;
      said transmitting device further having means for compressing said encrypted character string to create a scrambled image to be sent according to said established facsimile transmission standard; and
   b. a receiving device having the capacity of receiving a facsimile transmission according to said established facsimile transmission standard, wherein said receiving device further comprises:
      1. special memory means for saving said scrambled image waiting for its designated recipient of said document;
      2. means for expanding said scrambled image saved in said special memory means into a character string stored in said receiving device;
      3. means for decrypting said character string stored in said receiving device into a decrypted character string stored in said receiving device;

4. means for converting said decrypted character string stored in said receiving device back into a restored image of said document stored in said receiving device; and
5. means for printing said document in decrypted form from said restored image of said document.

6. The system in accordance with claim 5, wherein said transmitting device further comprises a central processing unit (CPU) for controlling the functions of said transmitting device.

7. The system in accordance with claim 5, wherein said transmitting device is a fax machine.

8. The system in accordance with claim 7, wherein said image generating means is a scanner.

9. The system in accordance with claim 7, wherein said encryption means is an encryption module.

10. The system in accordance with claim 7, wherein said encryption means is an encryption circuit.

11. The system in accordance with claim 5, wherein said transmitting device is a personal computer (PC).

12. The system in accordance with claim 11, wherein said image generating means is a printer driver installed in said PC.

13. The system in accordance with claim 11, wherein said encryption means is a software program installed in and executable by said PC.

14. The system in accordance with claim 11, wherein said compression means is a software program installed in and executable by said PC.

15. The system in accordance with claim 5, wherein said receiving device further comprises a central processing unit (CPU) for controlling the functions of said receiving device.

16. The system in accordance with claim 5, wherein said receiving device is a fax machine.

17. The system in accordance with claim 16, wherein said means is a decryption module.

18. The system in accordance with claim 16, wherein said means is a decrypting circuit.

19. The system in accordance with claim 16, wherein said printing means is a printer.

20. The system in accordance with claim 5, wherein said receiving device is a personal computer (PC).

21. The system in accordance with claim 20, wherein said decrypting means is a software program installed in and executable by said PC.

22. The system in accordance with claim 20, wherein said converting means is a software program installed in and executable by said PC.

23. The system in accordance with claim 20, wherein said printing means is a printer driver installed in said PC.

24. A method for providing a secured facsimile transmission of a document from a facsimile transmission device, said document being fed into said facsimile transmission device, said method comprising the steps of:
   a. generating a plurality of facsimile images of said document;
   b. causing said facsimile transmission device to read all 1,728 pixels of each facsimile line of said document sequentially and push it into a memory of the facsimile transmission device where each pixel represents one bit;
   c. taking data from each facsimile line with 8 bit packages which originally are unformatted and changing the data format to a byte where the byte has a value between 0 and 255;
   d. storing 216 bytes of each facsimile line sequentially in a byte array in the facsimile transmission device and transferring the 216 bytes to an encryption algorithm;
   e. after encryption of the byte array converting the byte array into a bit string;
   f. placing a marker string and an unencrypted header before the beginning of the encrypted bit string, the marker string being placed between the unencrypted header and the encrypted bit string;
   g. converting the encrypted bit string into pixels of a new, encrypted image;
   h. compressing said encrypted data and creating a TIFF Group 3 image; and
   i. sending the image to a facsimile device.

25. A method for providing a secured facsimile transmission of a document from a facsimile transmission device, said document being fed into said facsimile transmission device, said method comprising the steps of:
   a. generating a plurality of facsimile images of said document;
   b. causing said facsimile transmission device to read all 1728 pixels/dots of each facsimile line of said document sequentially and push it into a memory of the facsimile transmission device where each pixel/dot represents one bit and changing the data format to a byte where the byte has a value between 0 and 255 by standard;
   c. storing 216 bytes of each facsimile line sequentially in a byte array, in the facsimile transmission device, in which an encryption process controller unit is controlling the facsimile transmission device by a user input, wherein if the user input selects optimized encryption mode and the facsimile line consists of only white pixels/dots, then 216 bytes (constituting a fax line) are kept unencrypted and the 216 bytes are not transferred to an encryption algorithm, but if optimized encryption mode is selected and in the facsimile line is a minimum of one black pixel/dot, then the 216 bytes are transferred to an encryption algorithm, and if normal encryption mode is selected, then the whole facsimile is scanned line by line and the whole byte array (n*216 bytes depending on the sheet size) is sent to an encryption algorithm;
   d. after encryption of the byte array, the data is converted back to the original form (data order) of a series of bits (pixel/dots) as it existed after generation of the facsimile image except that it is now in encrypted form;
   e. placing a marker string and an unencrypted header before the beginning of the encrypted series of bits, the marker string being placed between the unencrypted header and the encrypted series of bits;
   f. compressing said encrypted data and creating a TIFF Group 3 image; and
   g. and sending the image to a facsimile device.

* * * * *